(12) United States Patent
DeVincent et al.

(10) Patent No.: US 7,048,667 B2
(45) Date of Patent: May 23, 2006

(54) POWER SPLIT TRANSAXLE FOR PRODUCING STEPLESS REVERSE, FORWARD AND GEARED NEUTRAL SPEED RATIOS

(75) Inventors: Ernie DeVincent, Northville, MI (US); Rolf Lequis, Hennef (DE)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 10/775,019

(22) Filed: Feb. 9, 2004

(65) Prior Publication Data

US 2005/0176548 A1 Aug. 11, 2005

(51) Int. Cl.
*F16H 37/02* (2006.01)
(52) U.S. Cl. .................. 475/214; 475/211; 475/218
(58) Field of Classification Search ........ 475/207–219; 74/348–352
See application file for complete search history.

(56) References Cited

U.S. PATENT DOCUMENTS

| | | | |
|---|---|---|---|
| 2,152,796 A | | 4/1939 | Erban |
| 4,644,820 A | * | 2/1987 | Macey et al. ............... 475/211 |
| 4,856,369 A | * | 8/1989 | Stockton ................ 74/665 GE |
| 4,875,389 A | * | 10/1989 | Fragnito ..................... 475/212 |
| 4,990,127 A | * | 2/1991 | Roberts et al. ............. 475/211 |
| 5,112,283 A | * | 5/1992 | Miyata et al. ............... 475/211 |
| 5,720,686 A | * | 2/1998 | Yan et al. .................... 475/211 |
| 5,876,299 A | * | 3/1999 | Kim et al. ................... 475/215 |
| 6,422,966 B1 | | 7/2002 | Haka |
| 6,540,639 B1 | * | 4/2003 | Gumpoltsberger .......... 475/215 |
| 6,561,942 B1 | * | 5/2003 | Wehking ..................... 475/216 |
| 6,659,901 B1 | * | 12/2003 | Sakai et al. .................. 475/218 |

FOREIGN PATENT DOCUMENTS

| | | |
|---|---|---|
| DE | 19858553 A1 * | 6/2000 |
| EP | 0 078 124 | 5/1983 |
| EP | 0 889 260 | 1/1999 |

\* cited by examiner

*Primary Examiner*—Tisha Lewis
(74) *Attorney, Agent, or Firm*—David B. Kelley; MacMillan, Sobanski & Todd

(57) ABSTRACT

The invention relates to a power split drive train that includes a variable speed ratio path and a fixed speed ratio path. An epicyclic gearset, driven at two inputs, one input continually connected to the variable path, combines the power from the fixed path and variable path. A coupler driveably connects one of the gearset inputs alternately to the fixed path and the variable path. With the coupler connecting the fixed path and the gearset input, the speed ratio of the variable speed ratio path varies over a range that produces a stepless range of reverse speed ratios, geared neutral and a stepless range of forward speed ratios. With the coupler connecting the variable path and a gearset input, the speed ratio of the variable speed ratio path varies over a range that produces higher speed ratios in forward drive.

13 Claims, 4 Drawing Sheets

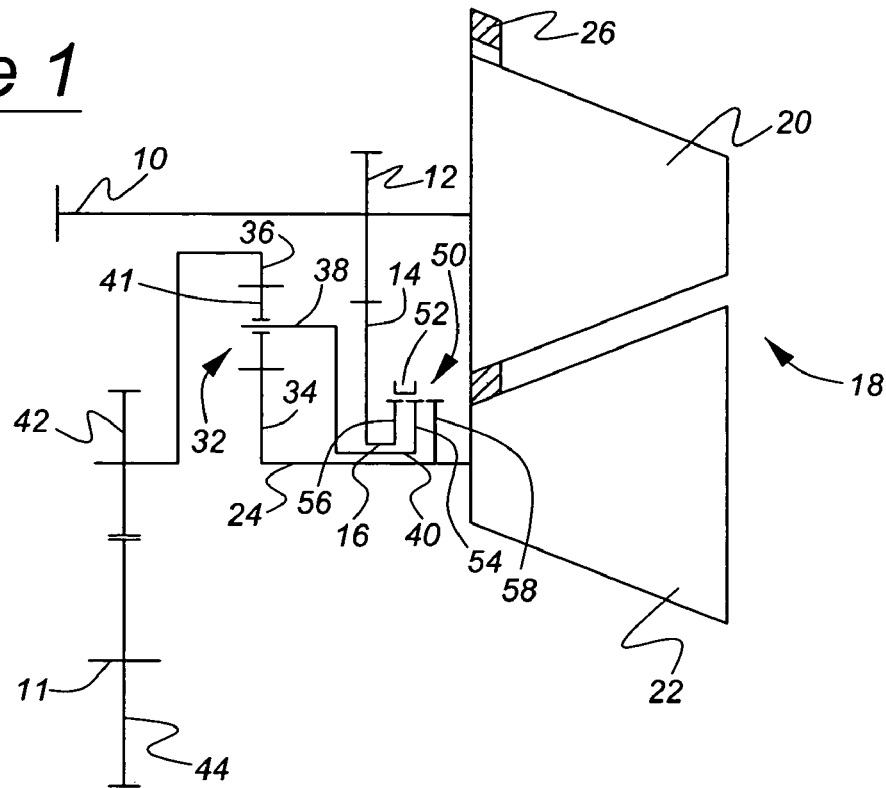
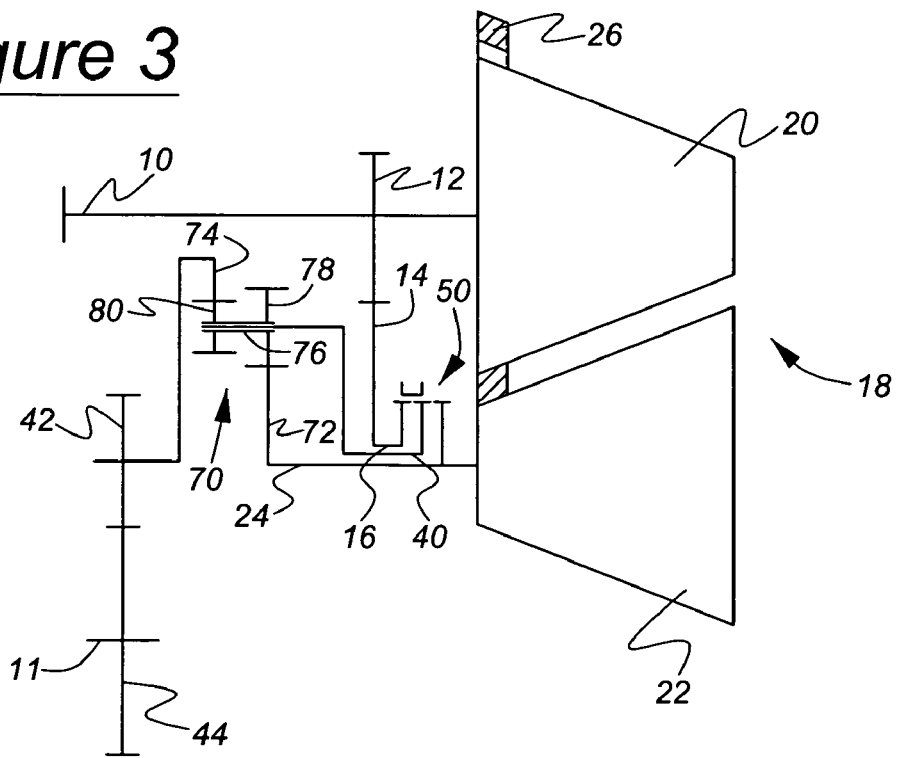

| Gear ratio iVar | Carrier 76 speed $n_C$ | Shaft 24 speed $n_{VarOut}$ | Ring 74 speed $n_R$ | Gear ratio of ring 74 $i$ | Gear ratio at final drive $i_{Total}$ | $i_{VarTotal}$ |
|---|---|---|---|---|---|---|
| -0.4 | -444 | -2500 | 529 | 1.9 | -8.0 | 1.7 |
| -0.5 | -444 | -2000 | 292 | 3.4 | -14.5 | 2.125 |
| -0.6 | -444 | -1667 | 135 | 7.4 | -31.6 | 2.55 |
| -0.7 | -444 | -1429 | 22 | 46.0 | -195.7 | 2.975 |
| -0.7232 | -444 | -1383 | 0 | ∞ | ∞ | 3.073661 |
| -0.8 | -444 | -1250 | -63 | -15.9 | 67.6 | 3.4 |
| -0.9 | -444 | -1111 | -129 | -7.8 | 33.0 | 3.825 |
| -1.0 | -444 | -1000 | -181 | -5.5 | 23.4 | 4.25 |
| -1.2 | -444 | -833 | -260 | -3.8 | 16.3 | 5.1 |
| -1.4 | -444 | -714 | -317 | -3.2 | 13.4 | 5.95 |
| -1.6 | -444 | -625 | -359 | -2.8 | 11.8 | 6.8 |
| -1.8 | -444 | -556 | -392 | -2.6 | 10.8 | 7.65 |
| -2.0 | -444 | -500 | -418 | -2.4 | 10.2 | 8.5 |
| -2.2 | -444 | -455 | -440 | -2.3 | 9.7 | 9.35 |
| -2.2500 | -444 | -444 | -444 | -2.3 | 9.6 | 9.5625 |
| -2.4 | -444 | -417 | -458 | -2.2 | 9.3 | 10.2 |
| -2.6 | -444 | -385 | -473 | -2.1 | 9.0 | 11.05 |
| -2.8 | -444 | -357 | -486 | -2.1 | 8.7 | 11.9 |

*Figure 4*

POWER SPLIT TRANSAXLE FOR PRODUCING STEPLESS REVERSE, FORWARD AND GEARED NEUTRAL SPEED RATIOS

BACKGROUND OF THE INVENTION

1. Field of the Invention

This invention relates to power transmissions, more particularly to continuously variable, traction transmissions especially those for motor vehicles.

2. Description of the Prior Art

Various transmissions that produce a continuously variable, stepless range of speed ratios have been developed. Usually these transmissions include a variator for producing all the speed ratios. One type of variator includes variable diameter sheaves driveably engaged by a drive belt or chain, which changes its radius of contact on the sheaves as the sheaves move axially. Usually a gearset is required to produce reverse drive with a belt drive variator of this type.

Toroidal traction drive transmissions use either half-toroidal or full-toroidal traction drives, which typically employ dual cavities for maximum efficiency. The dual cavity units have two input discs and two output discs each having a toroidal or partial toroidal shape. The output discs are typically located centrally between the input discs. Each input disk is engaged with an output disc through traction rollers. The angle of the rollers is varied to change the drive ratio between the input and output discs.

Toroidal variators are used to produce neutral, reverse and slow forward drive by combining a direct output from the vehicle's engine and an indirect output from the variator, which is reversed in directional sense. In this way the transmission produces either a low range of reverse speed ratios, a low range of forward speed ratios, and geared neutral, in which the engine is rotating, but the variator output is rotating in the opposite sense and the combined output is zero.

European Patent EP 0 078 124 describes a transmission that includes an input shaft for connection to an engine crankshaft, a rolling traction toroidal race, continuously-variable variator driven by the input shaft, and a simple epicyclic gearset comprising a sun gear, planetary gears on a carrier, and a ring gear. The gearset combines the output of the variator with the output of a step-up or step-down gear connected to the input shaft. The output of the variator is connected directly to one part of the epicyclic gear, the input shaft is connected via a step-up or step-down gear with another part of the epicyclic gear, and the output of the transmission system includes a gear, connectable by a first clutch to a third part of the epicyclic gear and by a second clutch to the output of the continuously-variable-ratio transmission.

SUMMARY OF THE INVENTION

The invention relates to a power split drive train that includes a variable speed ratio path and a fixed speed ratio path. An epicyclic gearset driven at two inputs, combines power transmitted from the fixed path and variable path. A coupler driveably connects one of the gearset inputs alternately to the fixed path and the variable path. With the coupler connecting the fixed path and the gearset input, the speed ratio of the variable speed ratio path varies over a range that produces a stepless range of reverse speed ratios, geared neutral and a stepless range of forward speed ratios. With the coupler connecting the variable path and a gearset input, the speed ratio of the variable speed ratio path varies over a range that produces a higher range of stepless speed ratios in forward drive by using the variable spread across the variator twice.

An advantage of this invention is the ability to combine the outputs of the fixed speed ratio path and variable speed ratio path with a simple epicyclic gearset and without the complexity of more complicated compound epicyclic gearsets. The transmission produces a stepless range of reverse drive speed ratio, geared neutral, and a stepless range of forward drive speed ratio. A coupler produces a simple, low cost swap or change in operation of the epicyclic gearset by connecting the fixed speed ratio path alternately to a carrier input of the gearset and the variable speed ratio to the carrier. A traction drive variator is particularly suited for use with the kinematic arrangement of the transmission.

A transmission assembly for producing a steplessly variable range of speed ratios according to this invention includes an input shaft; an output shaft; a variable speed ratio path driveably connected to the input shaft and including a first output; a fixed speed ratio path driveably connected to the input shaft and including a second output; a planetary gearset including a first input connected to the first output, a second input connected to the second output, and an output driveably connected to the output shaft; and a coupler continually driveably connected to the second output, and adapted to driveably connect the second output alternately to the first input and the second input.

The invention contemplates a method for operating a power split transmission according to this invention. The includes using the coupler to connect mutually the first output and the second input, varying the speed ratio produced by the variable speed ratio path, using the coupler to connect mutually the second output and the second input, and varying the speed ratio produced by the variable speed ratio path.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a schematic diagram showing a power split transmission according to this invention;

FIG. 3 is a schematic diagram showing another embodiment of a power split transmission according to this invention;

FIG. 4 is a chart showing the variation of various drive parameters over a range of gear ratios for the variator of FIG. 2.

DETAILED DESCRIPTION OF THE PREFERRED EMBODIMENT

Figure 2:
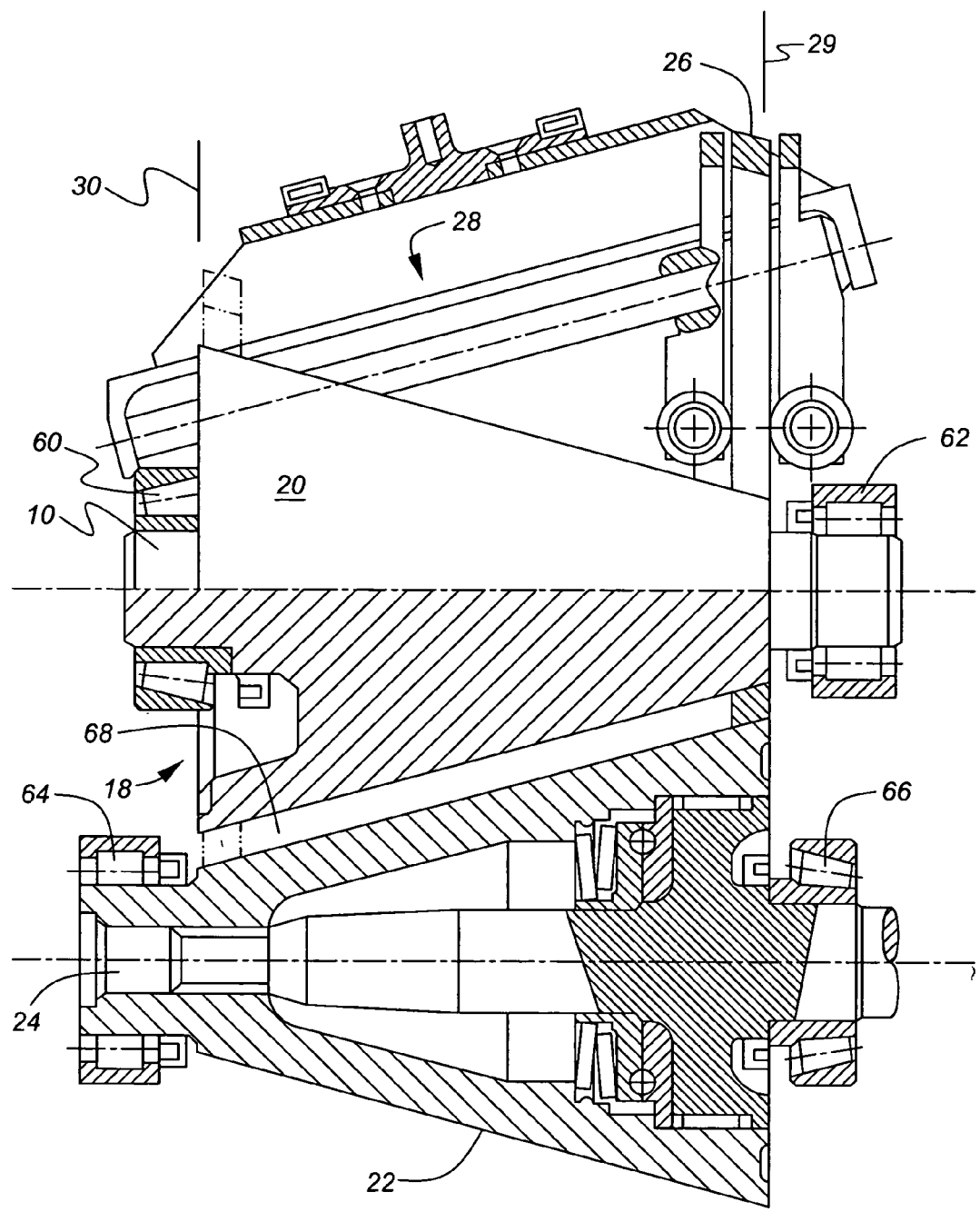
FIG. 2 is a cross section showing the variator of FIGS. 1 and 3.

Referring now to the drawings, there is illustrated in FIG. 1 a continuously variable speed ratio, power transmission system having an input shaft 10, adapted for a drive connection to a power source such as an engine (not shown), and an output shaft 11, adapted for a drive connection to the wheels of a motor vehicle or another rotating load.

The input shaft 10 drives two parallel torque paths. A fixed speed ratio path includes a pinion 12, fixed to the input shaft and meshing with a gear 14, which is fixed to an outer sleeve shaft 16. A variable speed ratio torque path includes a variator 18 having a first cone 20, fixed to and coaxial with the input shaft; a second cone 22, fixed to an intermediate shaft 24 coaxial with shaft 16; and a traction element or ring 26 in continuous frictional contact with the outer surfaces of the cones and located between the cones. Preferably the cones are truncated, right circular cylindrical cones. The traction element 26, looped over cone 20 with a radial gap and passing through a space between the cones 20, 22, moves automatically under control of a displacement mechanism 28 along the outer surface of the cone 20. In FIG. 2, traction element 26 is shown at the right-hand extremity 29 of its travel on the cones, where the variator produces its highest speed ratio, and at the left-hand end 30 of its travel on the cones, where the variator 18 produces its lowest speed ratio.

The outputs 16, 24 of the fixed and variable torque paths, respectively, are combined by a simple epicyclic gear indicated generally by the reference number 32. The epicyclic gearset includes a sun-gear 34, a ring gear 36, a carrier 38 driveably connected to sleeve shaft 40, and a set of planet pinions 41 rotatably supported on the carrier and meshing with the ring gear 36 and sun gear 34. The output of the variator 18 is continuously driveably connected by shaft 24 to the sun gear 34. The output of gearset 32 is taken at ring gear 36, which drives an output pinion 42, which is in continuous meshing engagement with output gear 44, fixed to the output shaft 11.

A coupler 50, which preferably is a dog clutch, but may be a synchronizer of the type used in a manual transmission for automotive use, includes a sleeve 52, supported on a hub 54 for axial sliding movement leftward and rightward. Preferably sleeve 52 has a set of spline teeth formed on its inner surface, and hub 54 has a set of spline teeth on its outer surface continually engaged with those of the sleeve 52. Similarly the spines of sleeve 52 are aligned and engageable mutually with spline teeth on the outer surfaces of a disc 56, which is secured to shaft 16. The spines of sleeve 52 are aligned with and engageable mutually with spline teeth on the outer surface of a disc 58, which is secured to shaft 24, the output of the variator.

In operation with the coupler sleeve 52 in the position shown in FIG. 1, coupler 50 mutually driveably connects input gear 14 and carrier 38. Another input to the gearset 32 is the variable speed ratio output of the variator 18, which is driveably connected continually to sun gear 34. Gearset 32 mixes the power output from these two torque delivery paths, and drives ring gear 36 at a speed ratio that varies in accordance with the speed ratio produced by the variator 18, assuming the speed of the input is constant.

Variator 18 first produces a low, negative gear ratio in comparison to the sense of direction of rotation of input shaft 10. Ring gear 36 and pinion 42 are driven at relatively high speed and the directional sense of rotation of output shaft 11 is high and negative, thereby producing reverse drive. As the gear ratio of variator 18 is increased negatively, the speed of ring gear 36 and output shaft 11 decrease. Eventually when the variator gear ratio reaches −0.7232, ring gear 36 and output shaft 11 stop rotating, and the transmission operates in a geared neutral condition. At negative variator gear ratios slightly less than the geared neutral gear ratio, reverse drive is produced. At variator gear ratios slightly larger than the geared neutral gear ratio, low speed forward drive is produced.

As the negative variator gear ratio is increased further, ring gear 36 and output 11 rotate in a positive or forward direction at an increasing speed ratio, which increases as the negative gear ratio of the variator increases. This provides forward drive at a relatively low speed ratio output, as is required to accelerate a motor vehicle from rest.

As the negative variator gear ratio approaches its limit, traction element 26 approaches the right-hand extremity 29 of its travel. Preferably before the maximum variator gear ratio is reached, when the variator gear ratio reaches −2.250 as shown in FIG. 4, the state of coupler 50 is changed by sliding sleeve 52 rightward to connect mutually the variator output shaft 24 and carrier 38. This action locks up the gearset 32. After planetary gearset 32 is locked-up by changing the state of coupler 50, the traction element 26 of the variator 18 is continually moved leftward, producing higher speed ratios across the variator. Because the planetary gear unit 32 is locked-up, the transmission output 11 is also driven at higher speed ratios. This drive condition is operative when the vehicle is at highway speed and the desired speed ratio to be produced by the transmission is high.

Cone 20 is supported rotatably by bearings 60, 62 coaxial with the axis of the input shaft 10; cone 22 is supported rotatably by bearings 64, 66 coaxial with the axis of shaft 24. The traction element 26 maintains elastic, resilient frictional contact with the outer surfaces of the cones due to its location in a space between the cones. Variator gear ratio changes occur quickly as the element 26 is sheared along the outer surface of the cones by the displacement mechanism, which may be controlled by an electronic control system in accordance with computer programmed control algorithms.

Figure 5:
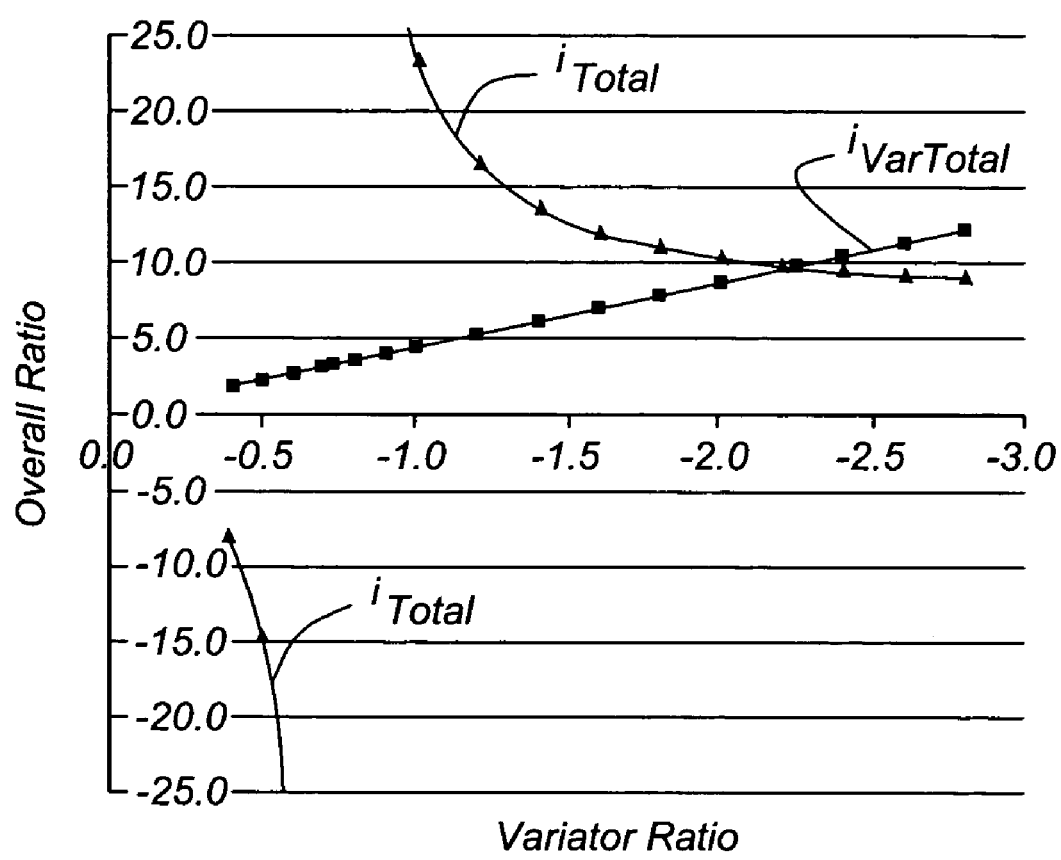
FIG. 5 is a graph showing the variation of component gear ratios with the variator gear ratio.

Referring now to FIGS. 3–5, an arrangement similar to that of FIG. 2 includes the fixed speed ratio path through pinion 12 and gear 14, and a variable speed ratio torque path through variator 18.

The outputs 16, 24 of the fixed and variable torque paths, respectively, are combined by a epicyclic gear 70, which includes a sun-gear 72; a ring gear 74; a carrier 76, driveably connected to sleeve shaft 40; a first set of planet pinions 78, rotatably supported on the carrier 76 and meshing with the sun gear 72; and a second set of planet pinions 80, coupled with planet pinions 78, rotatably supported on carrier 76, and meshing with ring gear 74. The output 24 of variator 18 is continuously driveably connected to the sun gear 72. The output of gearset 70 is taken at ring gear 74, which drives an output pinion 42, which is in continuous meshing engagement with output gear 44, fixed to the output shaft 11.

In a preferred embodiment, pinion 12 has 24 teeth, gear 14 has 54 teeth, sun gear 72 has 27 teeth, the pinions of planet pinion sets 78 and 80 each have 15 teeth, ring gear 74 has 57 teeth, the final drive set 42–44 has a gear ratio of −4.25, and the negative gear ratio produced by variator is in the range (0.4 to 2.8). FIG. 4 shows the values of various parameters over the range of the variator gear ratio, $i_{Var}$, with the input shaft rotating at 1000 rpm.

The geared neutral condition occurs when the negative gear ratio of variator 18 is −0.7232. When the variator gear ratio reaches −2.250, the state of coupler 50 is changed from the position shown in FIG. 3, where the coupler connects input gear 14 and carrier 76, to the rightward position, where the variator output shaft 24 and carrier are connected mutually. This locks-up the planetary gear unit 70. Thereafter the traction element 26 is moved leftward and the variator produces higher speed ratios. Because the planetary gear unit 70 is locked-up, the transmission output 11 is also driven at higher speed ratios. This drive condition is operative when the vehicle is at highway speed and the desired speed ratio to be produced by the transmission is high.

FIG. 5 is a graph showing the variation of the final drive gear ratio and the total variator gear ratio with changes over the full range of the variator gear ratio.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

We claim:

1. A transmission assembly for producing a steplessly variable range of speed ratios, comprising:
    an input shaft;
    an output shaft;
    a variable speed ratio path driveably connected to the input shaft and including a first output;
    a fixed speed ratio path driveably connected to the input shaft and including a second output;
    a planetary gearset including a first input secured to the first output, a second input, and an output driveably connected to the output shaft; and
    a coupler continually secured to the second input, and adapted to driveably connect the second input alternately to the first output and the second output.

2. The assembly of claim 1, wherein:
    an input of the variable speed ratio path is arranged coaxially with the input shaft; and
    an input of the fixed speed ratio path is arranged coaxially with the input shaft.

3. The assembly of claim 1, wherein variable speed ratio path comprises a variator for producing a continuously-variable, stepless speed ratio range, the variator including:
    truncated cones having mutually parallel axes, each cone having a conical surface having a large diameter section located adjacent a smaller diameter section of the other cone, and
    a traction element displaceable along an outer surface of a cone, said element driveably engaged with the conical surface of each cone.

4. The assembly of claim 1, wherein the fixed speed ratio path comprises:
    a input pinion driveably connected to the input shaft; and
    an input gear in meshing engagement with the input pinion, arranged coaxially with the first output, and adapted for a drive connection through the coupler to the second input.

5. The assembly of claim 1, wherein the planetary gearset comprises:
    a sun gear driveably connected to the first output;
    a ring gear driveably connect to the output shaft;
    a carrier; and
    a set of planet pinions supported rotatably on the carrier and in meshing engagement with the sun gear and the ring gear.

6. The assembly of claim 1, wherein the planetary gearset comprises:
    a sun gear driveably connected to the first output;
    a ring gear driveably connect to the output shaft;
    a carrier adapted for a drive connection through the coupler to the second output; and
    a first set of planet pinions supported rotatably on the carrier and in meshing engagement with the sun gear; and
    a second set of planet pinions supported rotatably on the carrier and in meshing engagement with the ring gear.

7. The assembly of claim 1, further comprising:
    a final drive gearset including an output pinion driveably connected to the output, and an output gear in meshing engagement with the output pinion.

8. A method for operating a power split transmission including a variable speed ratio path driveably connected to an input shaft and including a first output, a fixed speed ratio path driveably connected to the input shaft and including a second output, a planetary gearset including a first input continuously driveably connected to the first output, a second input connected to the second output, and a coupler, the method comprising the steps of:
    using the coupler to connect mutually the first output and the second input;
    varying the speed ratio produced by the variable speed ratio path;
    using the coupler to connect mutually the second output and the second input; and
    varying the speed ratio produced by the variable speed ratio path.

9. The method of claim 8, wherein the planetary gearset includes a sun gear driveably connected to the first output, a ring gear, a carrier, and a set of planet pinions supported rotatably on the carrier and in meshing engagement with the sun gear and the ring gear, wherein:
    the step of using the coupler to connect mutually the first output and the second input further comprises using the coupler to connect mutually the first output and the carrier; and
    the step of using the coupler to connect mutually the second output and the second input further comprises using the coupler to connect mutually the second output and the carrier.

10. The method of claim 8, wherein the step of varying the speed ratio produced by the variable speed ratio path includes the step of moving the traction element along an outer surface of a cone such that the output shaft is driven in a stepless range of reverse speed ratios.

11. The method of claim 8, wherein the step of varying the speed ratio produced by the variable speed ratio path includes the step of moving the traction element along an axis of a cone such that the output shaft is driven in a stepless range of forward speed ratios.

12. The method of claim 8, wherein the step of varying the speed ratio produced by the variable speed ratio path includes the step of moving the traction element along an outer surface of a cone such that the output shaft does not rotate.

13. The method of claim 8, wherein the variable speed ratio path includes a variator for producing a continuously-variable, stepless speed ratio range, the variator including truncated cones having mutually parallel axes, each cone having a conical surface having a large diameter section located adjacent a smaller diameter section of the other cone, and a traction element driveably engaged with the conical surface of each cone, and wherein the step of varying the speed ratio produced by the variable speed ratio path includes the step of moving the traction element along an outer surface of a cone.

* * * * *